United States Patent
Karabulut

(10) Patent No.: US 12,368,581 B2
(45) Date of Patent: Jul. 22, 2025

(54) CRYPTOGRAPHIC PROCESSING SYSTEM AND METHOD FOR IMPLEMENTING CRYSTALS-KYBER CRYPTOGRAPHIC ALGORITHMS AND CRYSTALS-DILITHIUM CRYPTOGRAPHIC ALGORITHMS USING TABLE-BASED ARITHMETIC-TO-BOOLEAN (A2B) MASKED SHARE CONVERSION

(71) Applicant: PQSECURE TECHNOLOGIES, LLC, Boca Raton, FL (US)

(72) Inventor: Emre Karabulut, Raleigh, NC (US)

(73) Assignee: PQSecure Technologies, LLC, Boca Raton, FL (US)

( * ) Notice: Subject to any disclaimer, the term of this patent is extended or adjusted under 35 U.S.C. 154(b) by 0 days.

(21) Appl. No.: 18/840,363

(22) PCT Filed: Sep. 19, 2023

(86) PCT No.: PCT/US2023/033158
§ 371 (c)(1),
(2) Date: Aug. 21, 2024

(87) PCT Pub. No.: WO2025/036945
PCT Pub. Date: Mar. 27, 2025

(65) Prior Publication Data
US 2025/0167990 A1 May 22, 2025

(51) Int. Cl.
*H04L 9/08* (2006.01)
(52) U.S. Cl.
CPC .................. *H04L 9/0852* (2013.01)
(58) Field of Classification Search
None
See application file for complete search history.

(56) References Cited

U.S. PATENT DOCUMENTS

| | | |
|---|---|---|
| 2019/0312728 A1 | 10/2019 | Poeppelmann |
| 2020/0265167 A1* | 8/2020 | Banerjee ............... H04L 9/0631 |
| 2021/0406406 A1 | 12/2021 | Hutter et al. |

(Continued)

OTHER PUBLICATIONS

D'Anvers. "One-Hot Conversion: Towards Faster Table-Based A2B Conversion." In: Eurocrypt 2023: 42nd Annual International Conference on the Theory and Applications of Cryptographic Techniques, Lyon, France, Apr. 23-27, 2023, [online] [retrieved on Nov. 28, 2023 (Nov. 28, 2023)] Retrieved from the Internet <URL: https://dl.acm.org/doi/10.1007/978-3-031-30634-1_21>, entire document.

*Primary Examiner* — Brandon Hoffman
(74) *Attorney, Agent, or Firm* — Mark C. Johnson; Johnson Dalal

(57) ABSTRACT

A system and method for implementing CRYSTALS-KYBER cryptographic algorithms and CRYSTALS-Dilithium cryptographic algorithms using table-based Arithmetic-to-Boolean (A2B) masked share conversion that includes dividing an N-bit arithmetic share, used in at least one of a CRYSTALS-KYBER cryptographic algorithm and a CRYSTALS-Dilithium cryptographic algorithm, into k chunks each of an n-bit value in a logic shift processing element, applying a table-based A2B masked share conversion to each n-bit value chunk to generate Boolean shares having k chunks with an n-bit value, and concatenating the k chunks of the generated Boolean shares to generate a complete N-bit Boolean share.

11 Claims, 3 Drawing Sheets

(56) References Cited

U.S. PATENT DOCUMENTS

| | | |
|---|---|---|
| 2022/0209944 A1 | 6/2022 | Nix |
| 2022/0337398 A1 | 10/2022 | Schneider et al. |
| 2023/0038135 A1 | 2/2023 | Gowanlock et al. |

* cited by examiner

US 12,368,581 B2

CRYPTOGRAPHIC PROCESSING SYSTEM AND METHOD FOR IMPLEMENTING CRYSTALS-KYBER CRYPTOGRAPHIC ALGORITHMS AND CRYSTALS-DILITHIUM CRYPTOGRAPHIC ALGORITHMS USING TABLE-BASED ARITHMETIC-TO-BOOLEAN (A2B) MASKED SHARE CONVERSION

FIELD OF THE INVENTION

The present invention pertains broadly to cryptographic hardware mechanisms and associated systems and methods. Specifically, the invention delves into the innovative realm of arithmetic-to-Boolean conversion techniques, aiming to significantly amplify the efficiency of cryptographic operations within cryptographic systems and methods. Furthermore, the invention embodies the core principle of augmenting side-channel resistance, thereby bolstering the overall security posture of cryptosystems.

BACKGROUND OF THE INVENTION

In the rapidly evolving world of quantum computing, the boundaries of computational power are constantly being redefined. Quantum computers, harnessing the principles of quantum mechanics, promise processing capabilities that dwarf those of classical computers. Their potential to solve complex mathematical problems in mere seconds threatens the very backbone of classical cryptography. Current encryption standards, which have been foundational in securing our digital world for decades, are rendered vulnerable in the face of these quantum advancements.

Recognizing the profound implications of quantum computing on global cybersecurity, the National Institute of Standards and Technology (NIST) has been at the forefront of efforts to standardize post-quantum cryptographic algorithms. As part of this initiative, NIST has been rigorously evaluating submissions from researchers worldwide, emphasizing both security and efficiency.

After meticulous evaluation through its third round, NIST announced the identification of four candidate algorithms for standardization, highlighting two primary choices: CRYSTALS-KYBER (ML-KEM) for key establishment and CRYSTALS-Dilithium (ML-DSA) for digital signatures. Both members of the CRYSTAL family were acknowledged not only for their unwavering security but also for their stellar performance.

With this endorsement, CRYSTALS-KYBER and CRYSTALS-Dilithium emerged as pioneering solutions in the post-quantum cryptographic panorama. NIST's expectations of their efficacy in most applications accentuate their significance in sculpting the future of cryptographic resilience in a quantum-rich environment. The era of quantum and classical computing convergence beckons, and the CRYSTAL family, fortified by NIST's recognition, stands poised at its forefront.

Although the CRYSTAL family is theoretically secure against quantum computers, their implementation might be insecure against physical attacks. Among them, differential side-channel attacks have risen as potent threats to cryptographic systems, having the capability to exploit subtle and often inadvertent leakages during cryptographic operations. These leakages, notably stemming from power consumption or electromagnetic emanation, can provide attackers with unintended insights into the underlying cryptographic secrets. Masking is an effective countermeasure against side-channel attacks that works by splitting sensitive variables into multiple randomized shares. A masked implementation operates on these shares in a way that prevents attackers from correlating physical side-channel information with the original secret variables.

SUMMARY OF THE INVENTION

Figure 1:
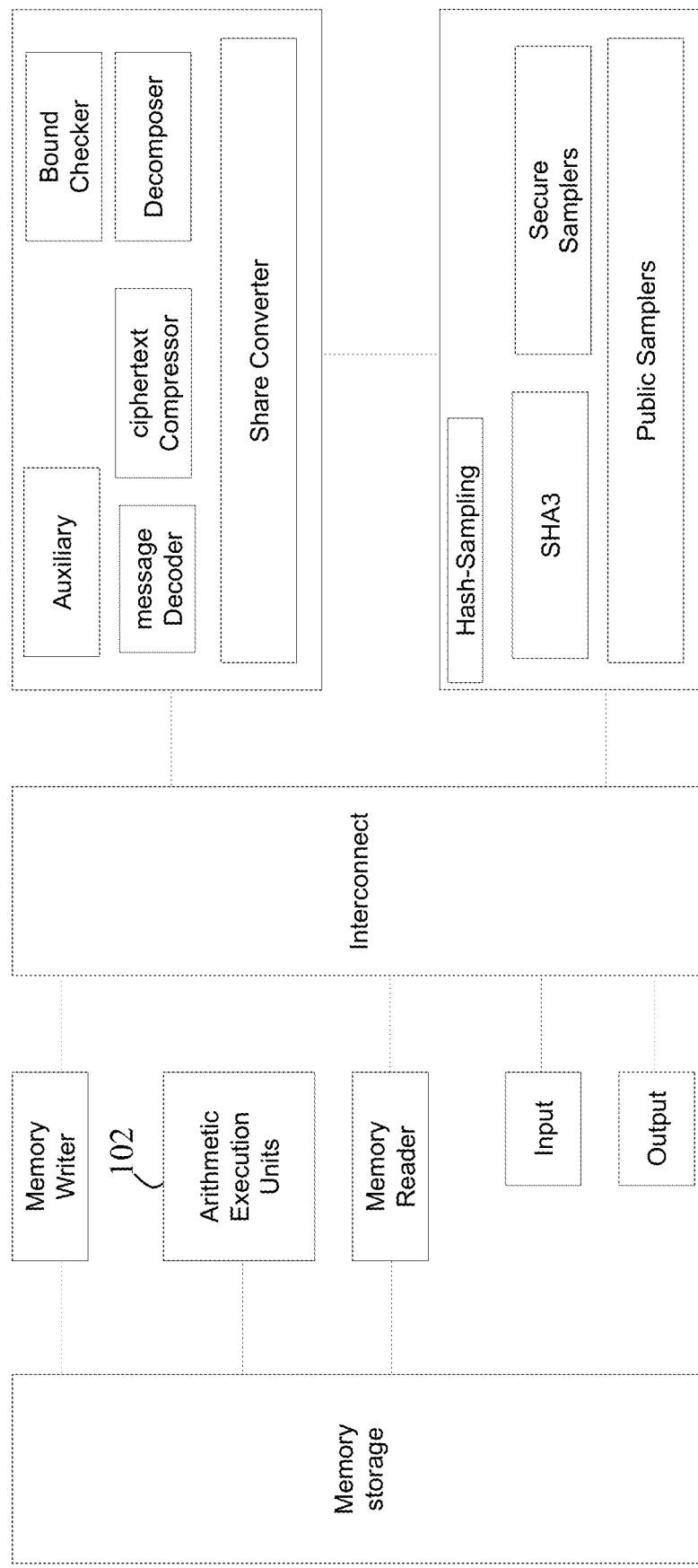
FIG. 1 is a block diagram depicting the masked architecture of CRYSTALS-KYBER having five main blocks: Memory storage, arithmetic execution units, interconnect, auxiliary unit, and hash-sampling, wherein the auxiliary unit employs a shared converter that converts masked shares either from A2B or B2A shares in accordance with one embodiment of the present invention.

The CRYSTAL family, comprising CRYSTALS-KYBER and CRYSTALS-Dilithium, extensively leverages both arithmetic and Boolean operations. While traditional cryptographic algorithms predominantly utilize Boolean operations, adapting the current state-of-the-art masking techniques to the CRYSTAL family presents a complex challenge. In this context, an arithmetic masked share is exclusively compatible with another arithmetic share, just as a Boolean share is confined to computation with another Boolean share. Given that the CRYSTAL family mandates the simultaneous deployment of both these operations, implementing CRYSTALS demands adept conversion functions, transitioning between arithmetic to Boolean (A2B) and vice versa (B2A). While the B2A conversion boasts a straightforward functionality and achieves its purpose with O(1) complexity, the A2B conversion stands out as a resource-intensive and time-consuming operation. Therefore, A2B conversion requires an efficient solution.

Two groundbreaking techniques have emerged to tackle the conversion quandary. The initial approach is rooted in the table-based Arithmetic-to-Boolean (A2B) methodology. Contrarily, the secondary strategy hinges on masked modular addition, specifically emphasizing the calculation of the carry for modular reduction. Although the table-based method provides superior efficiency over the modular addition, it falls short in its adaptability concerning prime numbers. It is crucial to underline that prime numbers hold paramount importance in cryptography, delineating the operational limits.

The invention offers an efficient mask implementation of CRYSTAL family table-based Arithmetic-to-Boolean (A2B) methodology in the use of CRYSTAL family implementation. The proposed implementation works with modulus number Q, which is larger than both prime numbers of CRYSTAL Kyber and CRYSTAL Dilithium. These small prime numbers are called q in the document. The proposed modulus is a power of 2 and therefore the proposed implementation does not require modular reduction steps while maintaining the correctness of functionality.

Although the invention is illustrated and described herein as embodied in a cryptographic processing system and method for implementing CRYSTALS-KYBER cryptographic algorithms and CRYSTALS-Dilithium cryptographic algorithms using table-based Arithmetic-to-Boolean (A2B) masked share, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

DETAILED EXPLANATION OF THE INVENTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

Figure 2:
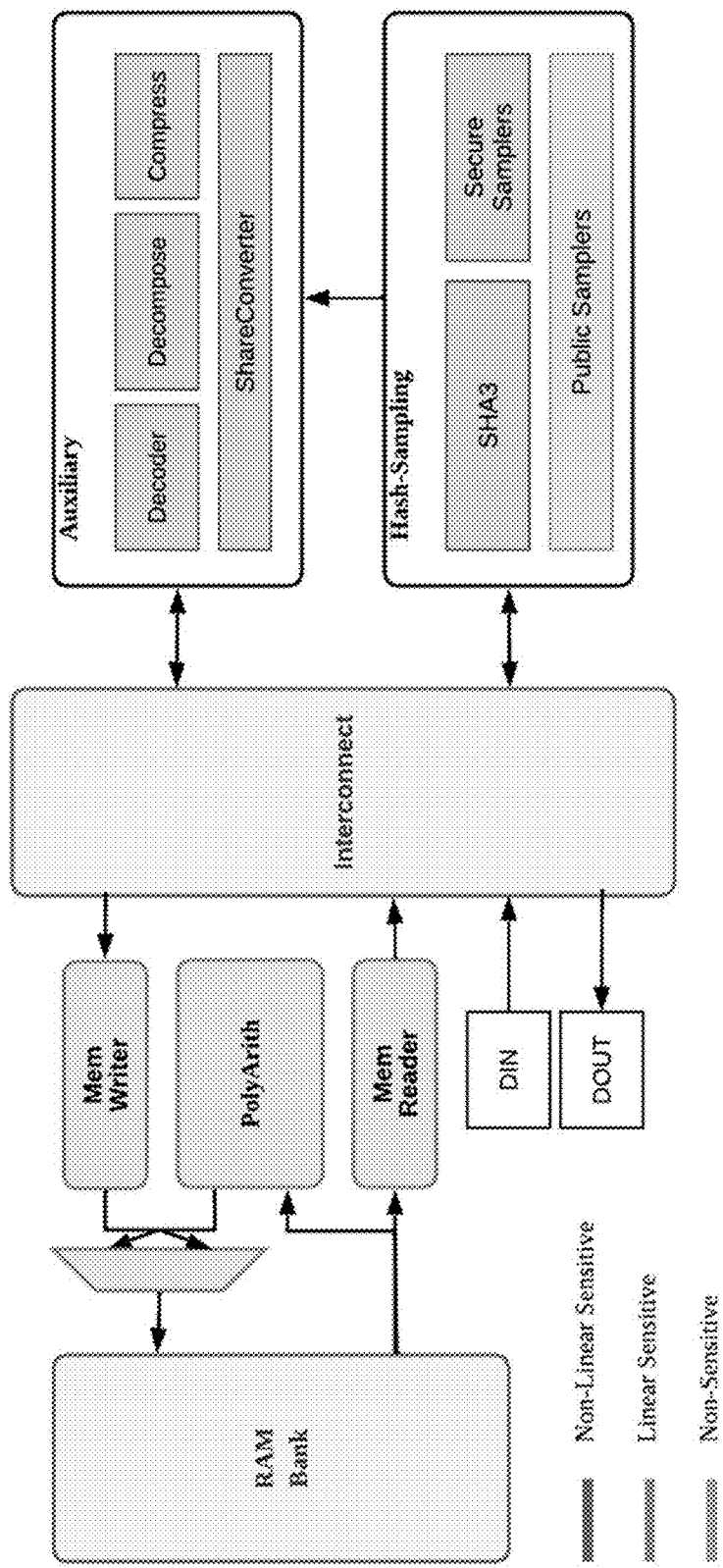
FIG. 2 is a block diagram depicting a cryptographic processing system for implementing CRYSTALS-KYBER cryptographic algorithms and CRYSTALS-Dilithium cryptographic algorithms using table-based Arithmetic-to-Boolean (A2B) masked share in accordance with one embodiment of the present invention.

The present invention provides a novel and efficient cryptographic processing system and method for implementing CRYSTALS-KYBER cryptographic algorithms and CRYSTALS-Dilithium cryptographic algorithms using table-based Arithmetic-to-Boolean (A2B) masked share. Referring now to FIGS. 1-2 for example, embodiments of the present invention are shown in block diagram views. FIGS. 1-2 show several advantageous features of the present invention, but, as will be described below, the invention can be provided in several shapes, sizes, combinations of features and components, and varying numbers and functions of the components. Furthermore, while a specific order of carrying out the cryptographic processing process described herein, the order of executing the steps may be changed relative to the order shown in certain embodiments. Also, two or more steps shown or described as occurring in succession may be executed concurrently or with partial concurrence in some embodiments. Certain steps may also be omitted for the sake of brevity. In some embodiments, some or all of the process steps can be combined into a single process.

More specifically, in both CRYSTAL Kyber and CRYSTAL Dilithium, the stipulation is that the coefficient modulus q is prime for arithmetic operations. In rings requiring these arithmetic operations, ensuring results lie between 0 and q−1. However, we use a larger number Q and allow the results to lie between 0 and Q−1 instead. This new and larger modulus number is power-of-2. Although this number increases operands of CRYSTAL Kyber and CRYSTAL Dilithium, this power-of-2 modulus avoids dedicated modular reduction operations such as Montgomery, Barret, etc. Generally, a safeguard against undesired modular reductions necessitates $Q > n*q^2$.

This requirement for Q can be relaxed under certain circumstances, e.g., when operands predominantly feature smaller coefficients—like an error or secret polynomial. Specifically, if a polynomial maintains its "smallness" (with its coefficients all existing within the range $[-\mu, +\mu] \mod q$), then a prime $Q > n*q*\mu$ will suffice. Such relaxation on Q enables optimized, though unprotected, hardware and software implementations of arithmetic operations to enhance processing speed.

Yet, challenges arise when a "small" polynomial undergoes arithmetic masking: the resultant coefficient shares, uniform in Zq, lose their "smallness". A straightforward remedy would be reverting to a larger prime $Q > n*q^2$, but this incurs a performance penalty. Our innovative approach introduces a paradigm shift: Instead of independently carrying out arithmetic operation $Q > n*q^2$ we opt for an unmasked multiplication with a relatively smaller. $Q > n*q*\mu$. This multiplication is then subjected to arithmetic masking modulo Q. The beauty of this technique lies in its indifference to modular reductions on the shares, assuring that the ultimate unmasked result emerges accurately.

Figure 3:
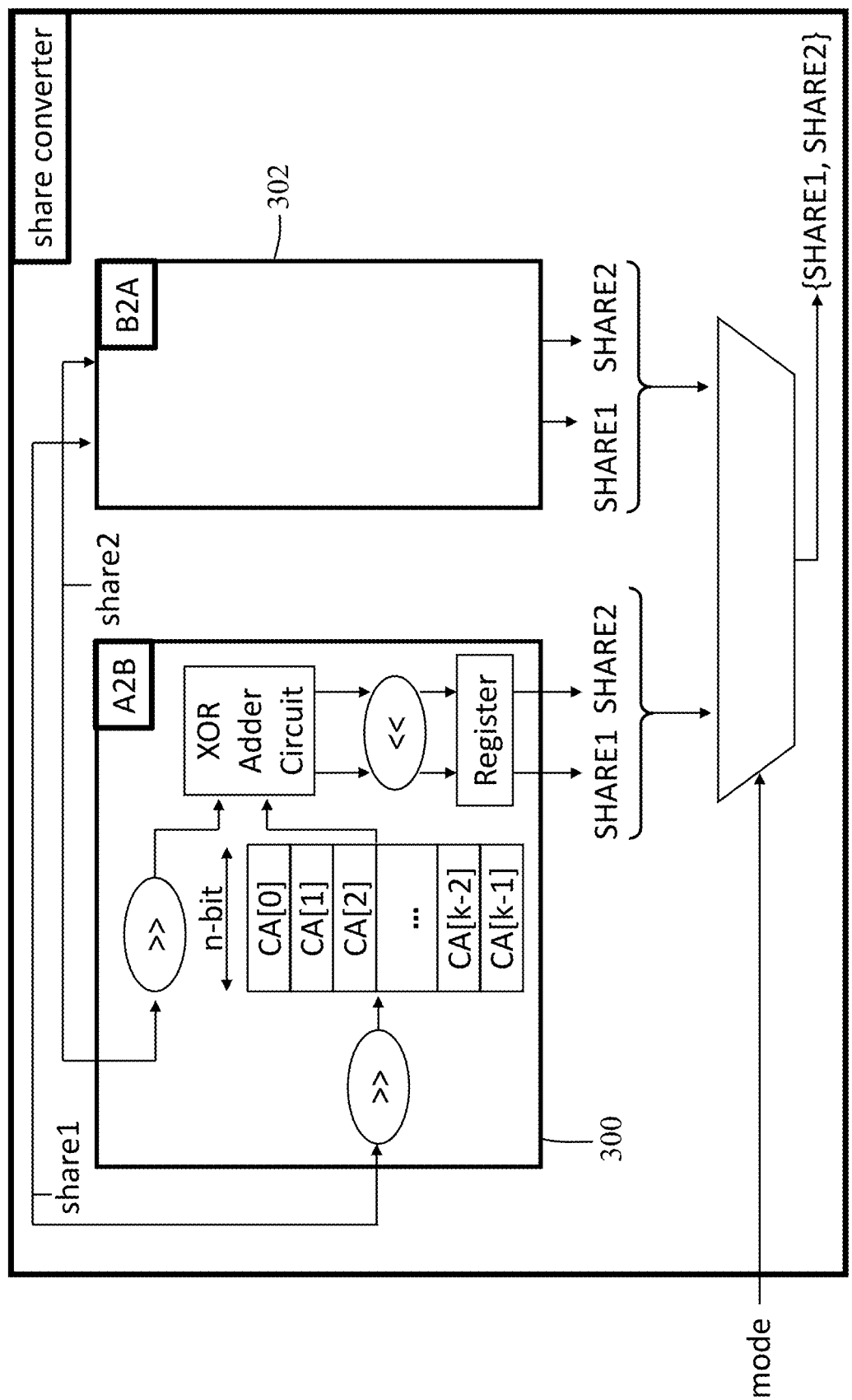
FIG. 3 is a block diagram depicting a share converter block that is a sub-block of the auxiliary unit and includes A2B or B2A converters based on the selected mode and configured to convert masked shares either from A2B or B2A shares, wherein the A2B shares are converted with the table-based method in accordance with one embodiment of the present invention.

The proposed A2B conversion method works with the number Q. The table-based conversion requires K entries to convert N-bit where K is $N^2$. Since the prime number is large, converting a large arithmetic share at once is very costly considering the table size. Therefore, the conversion method described herein is applied with k small chunks (n-bit) where N is k*n, thereby splitting a complete arithmetic share into k chunks where each chunk is n-bit. This splitting operation is implemented with logical shift operations. This logic shift element can be implemented with hardware logic elements, look-up-tables or shift instructions that are specially configured to be executed with a processor. For example, with reference to FIG. 3, the "<<" symbol represents the left logical shift and the ">>" symbol represents the right logical shift.

More specifically, a logic shift processing element is operably configured to divide an N-bit arithmetic share, used in at least one of a CRYSTALS-KYBER cryptographic algorithm and a CRYSTALS-Dilithium cryptographic algorithm, into k chunks each of an n-bit value. Additionally, the system also includes a first storage memory unit 300 (see, e.g., the n-bit CA table in FIG. 3) operably configured to apply a table-based A2B masked share conversion to each n-bit value chunk to generate Boolean shares having k chunks with an n-bit value. The system also incudes a second storage memory unit 302 (see, e.g., register element in FIG. 3), operably configured to concatenate the k chunks of the generated Boolean shares to generate a complete N-bit Boolean share used as an operand in the at least one of a CRYSTALS-KYBER cryptographic algorithm and a CRYSTALS-Dilithium cryptographic algorithm. The SHARE1 and SHARE2 from the first storage memory unit 300 and the second storage memory unit 302, respectively, received into a multiplexor for output.

Said differently, the present invention includes dividing an N-bit arithmetic share, used in at least one of a CRYSTALS-KYBER cryptographic algorithm and a CRYSTALS-Dilithium cryptographic algorithm, into k chunks each of an n-bit value in a logic shift processing element, applying a table-based A2B masked share conversion to each n-bit value chunk to generate Boolean shares having k chunks with an n-bit value, and concatenating the k chunks of the generated Boolean shares to generate a complete N-bit Boolean share. For clarity, a "complete" N-bit share refers to a share where all bits are fully represented. In contrast, an 'incomplete share' lacks some of the constituent bits, representing only a portion of a complete N-bit share.

In one embodiment, each k-chunk is an address operand of the first memory storage unit and the n-bit values from the first memory storage unit correspond to the address operand. As exemplified in FIG. 1, an arithmetic logic unit 102 is also utilized and operably configured to compute the returned n-bit values and carry out XOR addition and logical shift operations. In one embodiment, the N-bit arithmetic share is within a range with a maximum value of Q−1 and a minimum value of 0 and Q is larger than a coefficient modulus q of the CRYSTALS-KYBER cryptographic algorithm and the CRYSTALS-Dilithium cryptographic algorithm and Q is a power-of-2. Further, in one embodiment, any operand within the at least one of the CRYSTALS-KYBER cryptographic algorithm and the CRYSTALS-Dilithium cryptographic algorithm does not utilize any specialized modular reduction operation.

The process of the present invention also includes dividing the arithmetic share of N-logic bits into k-chunks of n-bit values wherein each k-chunk is an address operand of a memory storage unit, returning the n-bit values from the memory storage unit corresponding to the address operand, and computing the returned n-bit values with the arithmetic logic unit 102 operably configured to carry out XOR addition and logical shift operations. The table-based A2B masked share conversion also utilizes a memory storage unit communicatively coupled to the hardware processing element and that includes a predetermined number of $2^n$ entries each of an n-bit.

Specifically, n-bit chunks are individually converted to Boolean shares and then, in a final step, the k chunks Boolean shares are concatenated and resulted in a complete Boolean share. This concatenation is implemented with a logic shift element and a memory storage unit such as register. This method enables having a small table. However, the conversion time increases linearly because the small table can convert the first chunk of the large arithmetic share and then continue with the remaining chunks, and thereby the overall table needs k times conversion to perform a full conversion.

Said differently, the proposed A2B conversion technique described herein employs the sizable prime number Q. In a table-based conversion approach, converting an N-bit requires K entries, where K equals $N^2$. Given the magnitude of our modulus number, converting a large arithmetic share in a single sweep is prohibitive in terms of the required table size. To mitigate this, the conversion process divides the larger arithmetic share into k smaller chunks, each of n-bits, such that N is equivalent to k*n. This subdivision facilitates the use of a more compact table. However, this streamlined approach does come at a trade-off: the conversion time. Since the smaller table can only convert the first chunk of the larger arithmetic share at once, it then sequentially processes the subsequent chunks. As a result, the entire conversion demands k iterations, implying that the conversion time scales linearly.

The present invention thus offers a trade-off in compile-time. When the design is configured to the performance optimized, the table size increases but one arithmetic share can be converted in less execution time than the area-optimized one. The area-optimized one has a smaller table but requires multiple iterations to convert one large arithmetic share to a Boolean share with chunk-by-chunk method.

The conversion function uses two uniform random values, $r \in Zk$ and $\gamma, \in Zk$. Firstly, a table CA with k entries is generated. The table is implemented with a memory storage unit that can be register-file, RAM, ROM, etc., in hardware and Array, table, etc. in software. For a ranging from zero to k−1, each entry is computed as the following condition block:

$$CA[a]=\gamma \text{ if } a<k-r \text{ else } \gamma+1$$

This table is computed offline (before the conversion), and then the table is used to convert the n*k-bit arithmetic share to the Boolean share by following the Debraize method.

This table-based conversion is the first step of both CRYSTAL Kyber and CRYSTAL Dilithium architecture. First, these two algorithms perform their operations in the arithmetic domain. Second, the processed arithmetic shares come to the auxiliary domain for CRYSTAL Kyber and CRYSTAL Dilithium (see FIG. 1). All of the operations that require A2B conversion are bundled in the Auxiliary unit so that the same A2B unit is shared among these operations. The auxiliary domain has three main operations: Ciphertext compression, message decoding, decomposition, and bound checking along with the ShareConveter that handles the A2B conversion for all of these operations. Before passing the arithmetic shares to these three operations, the auxiliary first converts them into the Boolean domain by using the table-based conversion.

In masked CRYSTALS-Kyber, ciphertext compression, message decoding, and error sampling operations require Boolean and arithmetic sharing. For example, ciphertext compression and message decoding operations receive input in the form of arithmetically shared polynomial coefficients. However, internally, these operations require Boolean manipulation which is done efficiently using Boolean shares. This invention does not need to utilize a dedicated module to perform A2B conversion to process the inputs. Indeed, the A2B conversion is performed over Q, which is a power-of-2 number. Therefore, the reduction is performed by just keeping the first log2(Q) bits and discarding the remaining bits.

Similarly, for masked CRYSTALS-Dilithium, the decomposition, bound checking and sampling employ Boolean and arithmetic shares. For example, the decomposition and the bound checking operations accepts arithmetically shared data as input while executing these operations requires Boolean manipulation. Again, we perform a conversion from arithmetic to Boolean sharing to perform these operations efficiently.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above-described features.

What is claimed is:

1. A method for implementing CRYSTALS-KYBER cryptographic algorithms and CRYSTALS-Dilithium cryptographic algorithms using table-based Arithmetic-to-Boolean (A2B) masked share conversion comprising the steps of:
    dividing an N-bit arithmetic share within a range with a maximum value of Q−1 and a minimum value of 0, used in at least one of a CRYSTALS-KYBER cryptographic algorithm and a CRYSTALS-Dilithium cryptographic algorithm, into k chunks each of an n-bit value in a logic shift processing element, wherein Q is larger than a coefficient modulus q of the CRYSTALS-KYBER cryptographic algorithm and the CRYSTALS-Dilithium cryptographic algorithm and Q is a power-of-2;
    applying a table-based A2B masked share conversion to each n-bit value chunk to generate Boolean shares having k chunks with an n-bit value; and
    concatenating the k chunks of the generated Boolean shares to generate a complete N-bit Boolean share.

2. The method according to claim 1, further comprising: dividing the arithmetic share of N-logic bits into k-chunks of n-bit values wherein each k-chunk is an address operand of a memory storage unit.

3. The method according to claim 2, further comprising: returning the n-bit values from the memory storage unit corresponding to the address operand.

4. The method according to claim 3, further comprising: computing the returned n-bit values with an arithmetic logic unit operably configured to carry out XOR addition and logical shift operations.

5. The method according to claim 1, wherein the table-based A2B masked share conversion utilizes a memory storage unit communicatively coupled to the hardware processing element and that includes a predetermined number of $2^n$ entries each of an n-bit.

6. The method according to claim 1, wherein any operand within the at least one of the CRYSTALS-KYBER cryptographic algorithm and the CRYSTALS-Dilithium cryptographic algorithm does not utilize any specialized modular reduction operation.

7. A cryptographic processing system for implementing CRYSTALS-KYBER cryptographic algorithms and CRYSTALS-Dilithium cryptographic algorithms using table-based Arithmetic-to-Boolean (A2B) masked share conversion comprising:
    a logic shift processing element operably configured to divide an N-bit arithmetic share within a range with a maximum value of Q−1 and a minimum value of 0, used in at least one of a CRYSTALS-KYBER cryptographic algorithm and a CRYSTALS-Dilithium cryptographic algorithm, into k chunks each of an n-bit value, wherein Q is larger than a coefficient modulus q of the CRYSTALS-KYBER cryptographic algorithm and the CRYSTALS-Dilithium cryptographic algorithm and Q is a power-of-2;
    a first storage memory unit operably configured to apply a table-based A2B masked share conversion to each n-bit value chunk to generate Boolean shares having k chunks with an n-bit value; and
    a second storage memory unit operably configured to concatenate the k chunks of the generated Boolean shares to generate a complete N-bit Boolean share used as an operand in the at least one of a CRYSTALS-KYBER cryptographic algorithm and a CRYSTALS-Dilithium cryptographic algorithm.

8. The system according to claim 7, wherein each k-chunk is an address operand of the first memory storage unit.

9. The system according to claim 8, wherein the n-bit values from the first memory storage unit correspond to the address operand.

10. The system according to claim 9, further comprising: an arithmetic logic unit operably configured to compute the returned n-bit values and carry out XOR addition and logical shift operations.

11. The system according to claim 7, wherein any operand within the at least one of the CRYSTALS-KYBER cryptographic algorithm and the CRYSTALS-Dilithium cryptographic algorithm does not utilize any specialized modular reduction operation.

* * * * *